United States Patent [19]
Dechavanne

[11] 3,970,321
[45] July 20, 1976

[54] DYNAMIC-STATIC SHAFT SEAL
[76] Inventor: Jacques Dechavanne, 3 Boulevard de Jormadiere, Saint. Egreve, Isere, France
[22] Filed: Dec. 19, 1974
[21] Appl. No.: 534,164

[30] Foreign Application Priority Data
Dec. 19, 1973  France .............................. 73.45529

[52] U.S. Cl. .............................. 277/188 A; 277/27; 277/165; 277/186; 277/227
[51] Int. Cl.$^2$ ......................................... F16J 15/24
[58] Field of Search ................ 277/188, 165, 212 F, 277/227, 27, 117, 186, 194

[56] References Cited
UNITED STATES PATENTS

| | | | |
|---|---|---|---|
| 2,386,873 | 10/1945 | Mercier | 277/227 |
| 2,973,978 | 3/1961 | Oppenheim | 277/188 |
| 3,218,087 | 11/1965 | Hallesy | 277/188 |
| 3,810,639 | 5/1974 | Scannell | 277/188 |
| 3,854,735 | 12/1974 | Maurer et al. | 277/188 |

Primary Examiner—Richard E. Aegerter
Assistant Examiner—L. Footland
Attorney, Agent, or Firm—Karl F. Ross; Herbert Dubno

[57] ABSTRACT

A seal engageable with the outer surface of a shaft and fittable within an inwardly open groove formed in a housing between a high-pressure zone and a low-pressure zone has a cup packing integrally bonded to a supple pressure-distributing ring. The packing is of asymmetrical section and is formed with a radially extending flange and with a lip extending from one axial side of the flange toward the high-pressure zone with the inner face of the lip lying resiliently against the outer surface of the shaft. The pressure-distributing ring has an end surface bonded to the one side of the flange, an inner periphery formed with a recess snugly receiving and bonded to the outer face of the lip, and an outer periphery resiliently engaging the interior of the housing groove. A nonresilient antiextrusion ring is received in the packing at the other axial side of the packing.

6 Claims, 3 Drawing Figures

DYNAMIC-STATIC SHAFT SEAL

CROSS-REFERENCE TO RELATED APPLICATION

This application is related to copending application Ser. No. 471,909 filed May 21, 1974 and to my commonly filed patent applications Ser. Nos. 534,275 and 534,165.

FIELD OF THE INVENTION

My present invention relates to a seal. More particularly this invention concerns a hydraulic shaft or piston seal of the dynamic or static type for separating two zones at different pressures.

BACKGROUND OF THE INVENTION

Known seals serving the above-given purposes are normally formed by rings of toroidal shape or of rings which are simply of U-section without any filling serving to distribute pressure. When pressure-distributing blocks are used they are usually combined with U-section rings or with rectangular antiextrusion rings and fill the entire base of the groove or the region near the wall where the extrusion risk exists. There are also known seals which use U-section rings with a separate pressure distributing body that is not bonded to the U-section ring. This latter arrangement has the possibility that residual pressure builds up in a manner impossible in integral or bonded-together assemblies. Nonetheless all these seals have a symmetrical section which prevents them from functioning well at all pressures, particularly low pressure, and in addition these seals tend to have short service life even when provided with antiextrusion rings.

OBJECTS OF THE INVENTION

It is therefore an object of the present invention to provide an improved seal.

Another object is the provision of such a seal which is effective between zones having pressures which are either relatively equal or greatly different.

Yet another object is the provision of such a seal which has a long service life.

SUMMARY OF THE INVENTION

These objects are attained according to the present invention in a single-action seal formed of an annular monoblock or integral assembly comprising a cup packing and a supple pressure-distributing element. The packing has an asymmetrical section and is formed with an elongated lip which lies against the outside of the shaft being sealed which is embedded in and protected by the pressure-distributing body. The pressure in one of the two zones flanking the seal is transmitted to the outer face of the lip so as to press it against the shaft with a force which is proportional to the pressure differential between these two zones. In addition these forces are effective to press the outside periphery of the pressure-distributing body against the inside wall of the housing or the base of the groove which receives the seal. In addition the cup packing is formed on its axial side turned away from the lip with a recess in which is received a metallic antiextrusion ring.

In accordance with another feature of this invention the lip on the cup packing is relatively long and is reinforced. The seal acts as a static seal with the pressure-distributing body when there is no relative movement between the shaft and housing, whereas when there is motion the lip serves to form a very tight dynamic seal.

According to yet another feature of this invention it is possible for the lip to extend axially in either direction, depending on the pressure differential. In both cases the asymmetrical section of the seal remains the same.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
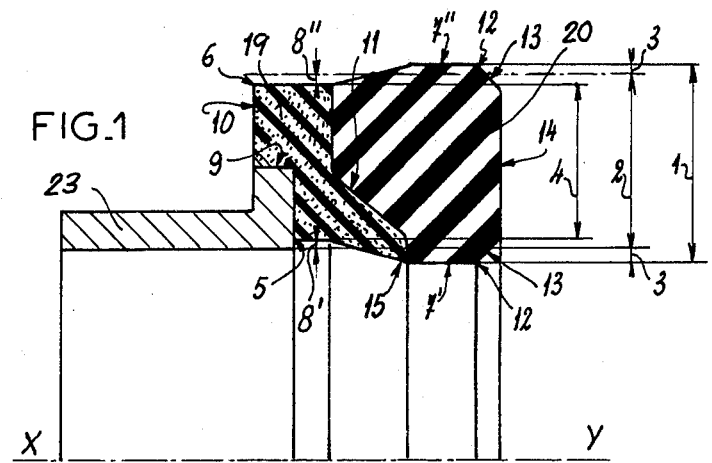
FIG. 1 is an axial section taken through a seal in accordance with the present invention.

As shown in FIG. 1 a seal according to the present invention comprises a so-called monoblock assembly, that is a unit which is integrally bonded to form effectively a single piece. This assembly is annular and centered on an axis xy. It basically comprises a cup packing or gland 19 bonded or vulcanized to a pressure-distributing ring 20.

Figure 3:
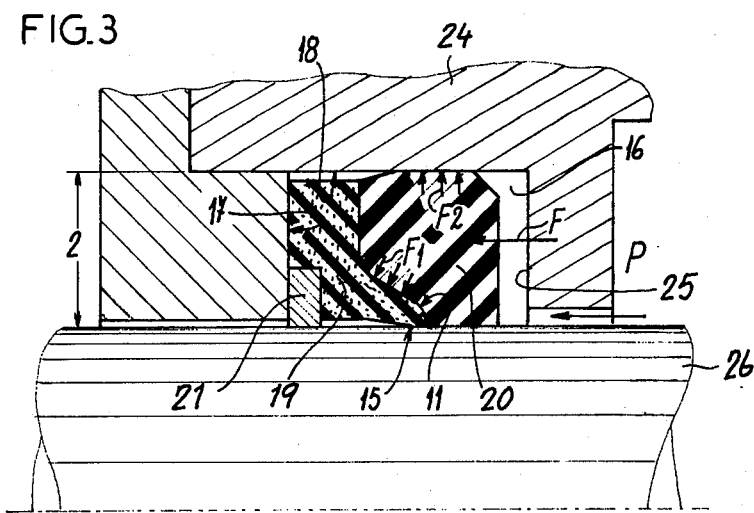
FIG. 3 is an axial section through another seal here mounted in a housing and engaging a shaft.

The pressure-distributing body 20 has a radial thickness 1 which is greater by a short radial distance 3 than the distance 2 between the inside wall of a housing groove and the outside wall of a shaft (3 FIG. 3). Thus the body 20 alone can act as a static seal.

In order to prevent the packing 19 from resting permanently in contact with the housing and shaft the inner periphery 5 of the packing 19 is spaced from the shaft surface by a distance 8' and the outer surface 6 by a distance 8''. In addition a rectangular-section recess 9 formed in the face 10 of the packing 19 is provided with an antiextrusion ring 23 that insures proper spacing of the packing 19 in the seal and allows it to be used between zones of greatly different pressures.

The other axial end face 11 of the packing 19 can be of any conventional shape but is wedded exactly to the corresponding end face of the body 20. The corners 12 of the body 20 turned away from the packing 19 are formed with chamfers 13 allowing it readily to be mounted in place without damage. In this manner the end face 14 of the body 20 is the only portion which can come into contact with the corresponding side wall of the groove in which it is mounted. The lip 15 of the packing 19 forms a continuous surface with the cylindrical inside periphery 7' of the body 20 so that it also is protected from damage during mounting of the assembly.

Figure 2:
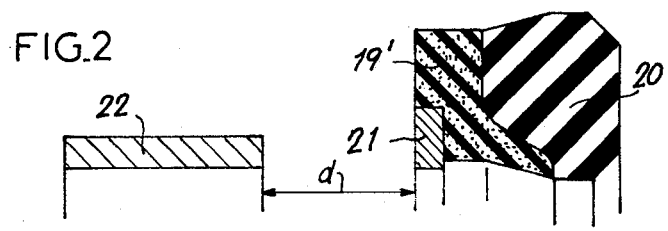
FIG. 2 is an axial section through another embodiment of the seal in accordance with the present invention.

FIG. 2 shows an arrangement wherein an extrusion ring 21 received in the packing 19 coacts with a separate sleeve 22 that is spaced from it by a distance $d$ so as to permit axial displacement of the seal. It is possible to provide several such sleeves 22 in front of or behind the seal so as to increase the number of contact surfaces and the guide distance.

FIG. 3 show the joint in use. It can be seen that a housing 24 is formed with a groove 16 of rectangular cross-section and having a base surface 18 engaging only the outer cylindrical surface 7'' of the body 20 and having a pair of side surfaces 17 and 25 engageable with the surfaces 10 and 14 respectively. The lip 15 and surface 7' engage the outer surface of a shaft 26 of circular section.

Pressure P from a high pressure zone is effective against the seal to displace it against the walls 17 and form a gap 16 between the face 14 and the face 25. This pressure P is transmitted into a force F which is effective on the body 20 so as to press its outer periphery 7'' against the wall 18 with a force F2 and so as to press against the surface 11 of the lip 15 with the force F1. In this manner the sealing pressure is directly proportional to the pressure differential across the seal. It should also be clear that as pressure F1 increases the amount of contact between the lip 15 and the shaft 26 similarly increases. The coefficient of friction between the surfaces 7'' and 18 is greater than between the sufaces 7' and shaft 26 so after pressure P exceeds a predetermined level the monoblock assembly 18 and 20 slides only relative to the shaft 26.

The elastomeric materials constituting the rings 19 and 20 are loaded with material decreasing the coefficient of friction such as molybdenum disulfide and graphite.

The seal according to the present invention can be used in all kinds of hydraulic single-acting cylinders or on the pistons in such cylinders. It is also possible to use them as the exit seals for piston rods of double-acting cylinders which must be sealed even when the pressure differential across them is zero. Furthermore the seal according to the present invention can readily be used in alternating piston pumps, and rotating assemblies and in hydraulic distributing valves.

I claim:

1. A sealing assembly comprising a shaft, a housing surrounding said shaft and formed with an inwardly open annular groove, and a seal received in said groove and surrounding said shaft, said seal being disposed in said housing between a high-pressure zone and a low-pressure zone formed therein, said seal comprising:

a cup packing of asymmetrical section and formed with radially extending flange and with a frustoconical lip extending from one axial side of said flange toward said high-pressure zone and having an inner face resiliently engageable with the outer surface of said shaft;

a supple pressure-distributing ring having an end surface bonded to said one side of said flange, an inner portion formed with a recess snugly receiving and bonded to the outer face of said lip, said recess having a frustoconical wall bonded to said outer face, a substantially cylindrical outer periphery resiliently engaging with and bottoming in the interior of said groove, and a substantially cylindrical inner periphery engaging said outer surface of said shaft, said lip having an inner face inclined inwardly toward said inner periphery and terminating flush therewith; and a nonresilient ring received in said packing at the other axial side thereof, said presssure-distributing ring retaining said packing out of engagement with the bottom of said groove and holding most of said lip out of engagement with said outer surface in the absence of a pressure differential across said zones.

2. The assembly defined in claim 1 wherein said packing and said pressure-distributing ring are elastomeric.

3. The assembly defined in claim 2 wherein the coefficient of friction between said pressure-distributing ring and said groove is greater than the coefficient of friction between said pressure-distributing ring and said packing on one side and said shaft on the other.

4. The assembly defined in claim 2 wherein said pressure-distributing ring has a radial thickness greater than the radial distance between said outer surface of said shaft and the base of said groove in an uncompressed state of said pressure-distributing ring.

5. The assembly defined in claim 4 wherein said pressure-distributing ring has another end surface formed at said peripheries with chamfers.

6. The assembly defined in claim 2 wherein said groove has an axial length greater than the combined axial length of said packing and said pressure-distributing ring.

* * * * *